United States Patent [19]

Boeckmann

[11] Patent Number: 4,672,664
[45] Date of Patent: Jun. 9, 1987

[54] TELEPHONE LINE MONITOR AMPLIFIER

[75] Inventor: Eduard F. B. Boeckmann, Huntsville, Ala.

[73] Assignee: GTE Communication Systems, Inc., Northlake, Ill.

[21] Appl. No.: 809,683

[22] Filed: Dec. 16, 1985

[51] Int. Cl.[4] ............................................. H04M 1/60
[52] U.S. Cl. .................................... 379/395; 330/296; 379/387
[58] Field of Search ................ 179/81 B, 81 A, 81 R, 179/16 AA, 16 F; 330/310, 296, 255, 257, 260, 288, 293; 397/387, 388, 390, 395

[56] References Cited

U.S. PATENT DOCUMENTS 3,983,502  9/1976  Wheatley, Jr. ................ 330/257 X
4,523,057  6/1985  Boeckmann ........................ 379/395

OTHER PUBLICATIONS

"An Integrated Telephone Speech Circuit Including a Line Fed Loudspeaker Amplifier", Eberhardt et al., IEEE Journal of Solid-State Circuits, vol. SC-17, No. 3, Jun. 1982, pp. 494-498.

Primary Examiner—Gene Z. Rubinson
Assistant Examiner—R. Vaas
Attorney, Agent, or Firm—Robert J. Black

[57] ABSTRACT

A transistorized current amplifier based on a cascode stage feeding into a composite transistorized output stage. The amplifier employs a constant current source, decoupling (isolation) from the power source and a signal limiting network to lower distortion on high signal input conditions. A two-wire device, the amplifier derives signal and power from a telephone line. Surge protection is provided by a signal limiting network and the inclusion of relatively high value resistors in the circuit.

14 Claims, 1 Drawing Figure

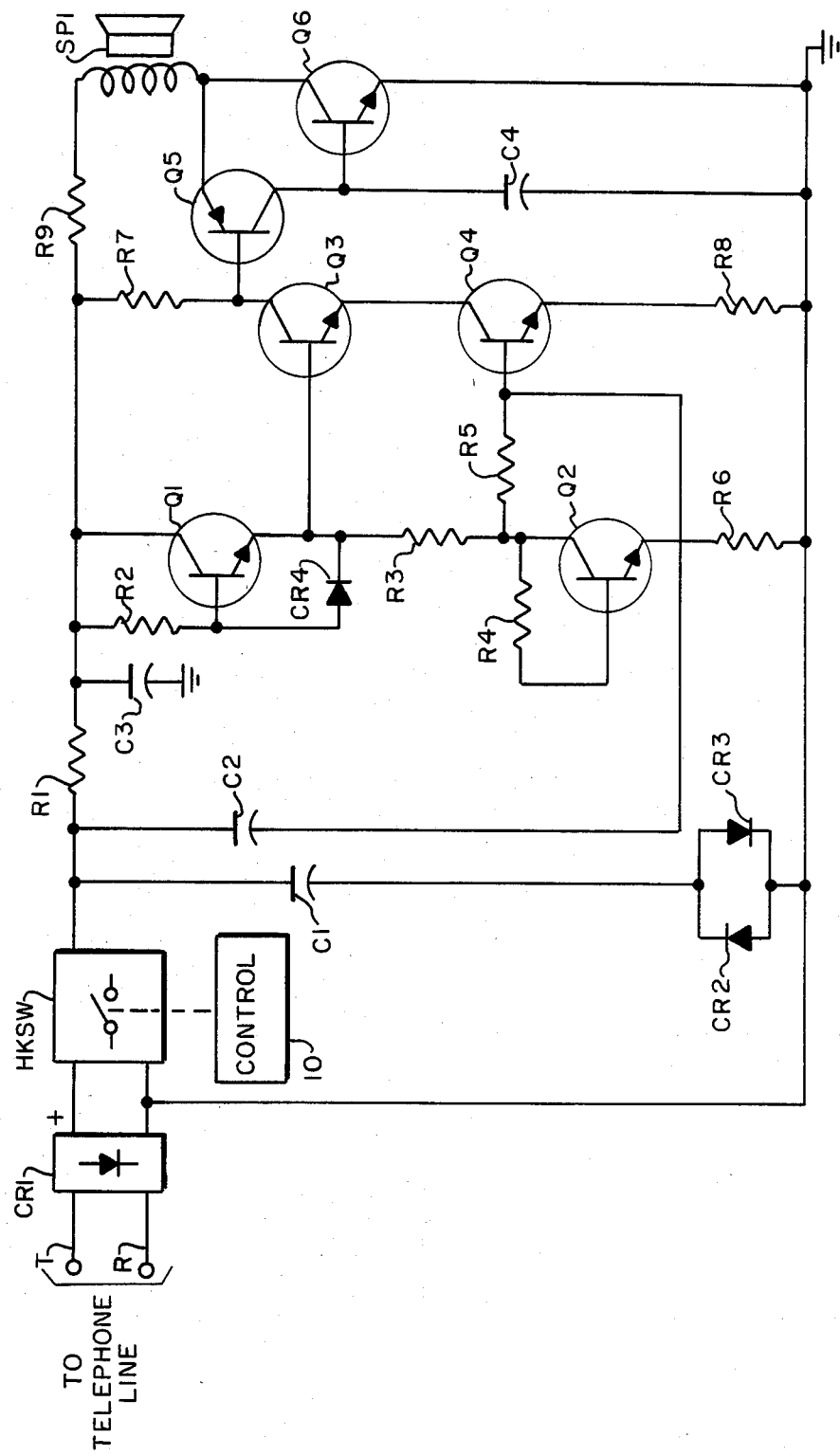

TELEPHONE LINE MONITOR AMPLIFIER

CROSS-REFERENCE TO RELATED APPLICATION

This application is related to my application Ser. No. 596,175 which issued on June 11, 1985 as U.S. Pat. No. 4,523,057 entitled "High Gain Cascode Amplifier With Negative Feedback".

BACKGROUND OF THE INVENTION

1. Technical Field

The present invention relates to telephone instruments and more particularly, to an amplifier for use in a telephone instrument which monitors the status of a telephone call while leaving the handset onhook.

2. Background Art

Since the advent of the electronic telephone many different features have been added to the telephone instrument. One such feature is the ability to monitor the progress or status of a call with an amplified signal to a loudspeaking device or similar transducer in order for the user to be able to hear signals. In this manner conditions such as dial tone, busy signal, ring-back signal and voice answer can be heard from a speaker or similar transducer inside the telephone instrument. In this mode the hookswitch is connected by a relay or other parallel switching device to maintain the telephone instrument in the operated condition.

This monitor feature is similar to that found in the so called loudspeaking telephones wherein the voices from the receive channel are amplified and applied to the speaker so that the received voice can be heard without holding a handset to the user's ear. Such loudspeaking telephones usually require an external source of power other than the telephone line itself. This is particularly true since it is difficult to drive a loudspeaker from the telephone line to sufficient loudness without draining excessive current from the telephone instrument itself or from the telephone line. This is particularly important because the telephone instrument must function properly so that such functions as loop supervision and address signalling can take place while in the monitor mode.

Most prior art circuitry of this type has utilized operational amplifier circuits to provide the monitor function. Such circuits generally require sources of both positive and negative voltage i.e. +15 volts and −15 volts DC as well as requiring the utilization of a significant number of capacitors and resistors to support the integrated circuit operational amplifiers. Some of the circuits make use of integrated audio amplifiers. Such amplifiers are expensive and sometimes critical in their application within the telephone instrument. An example of this is found in the use of the LM384 integrated circuit manufactured by National Semiconductor Inc. which is critical as to the layout of circuit traces and component locations on the printed circuit board. The GTE 2000 series of telephones manufactured by GTE Communication Systems Corporation is an example of the use of commercially available integrated circuit amplifiers for the monitor function. In such applications the type of amplifier used must be capable of high gain and low distortion preferably with a low impedance miniature loudspeaker.

Many early prior art designs required relatively high values for loudspeaker impedance in many instances being greater than 40 Ohms. A much more desirable range of loudspeaker impedance is in a range from 4 to 16 Ohms because of the greater economy and availability of such units. It should be noted that there is also a very limited variety of available integrated circuit audio amplifiers suitable for telephone line powered use.

SUMMARY OF THE INVENTION

The present invention which can be implemented in either discrete or integrated circuit form consists of a six transistor current amplifier based on a cascode stage feeding into a composite transistor output stage. The amplifier employs a constant current source, decoupling (isolation) from the power source and signal limiting network to lower distortion on high signal input conditions. The amplifier of the present invention is a two-wire device in that it derives signal and power from the telephone line at the positive polarity guard and the negative or common terminal usually found in a typical telephone instrument of current manufacture. Surge protection is provided by the signal limiting network and relatively high values of resistors included in the circuit.

Starting from the positive output of the telephone instrument polarity guard a large value electrolytic capacitor and two parallel diodes provide the basic signal limiting and surge protection. This network is connected across the circuit from the positive input to common input. The diodes are arranged so as to start conducting on high level signals to shunt some of the signals to common thereby limiting signal level or surges at the two-wire input to the circuit. Another capacitor conducts a signal to the first stage of the amplifier. A current source is formed by a transistor, a diode and a resistor providing bias current for the cascode portion of the amplifier. The first stage of the cascode section includes a current mirror transistor for control of bias current to the first transistor of the two transistor cascode arrangement. The signal input is applied to the base of the first transistor and the cascode pair. The emitter resistors are applied to the emitter circuits of the current mirror transistor and the first stage of the cascode pair for DC stability and a small amount of negative feedback. The cascode pair is then connected to the composite transistor output stage forming a current amplifier.

The load is connected in the collector circuit of the composite transistor and is a low impedance loudspeaker. It should be noted that the DC current is allowed to flow through the loudspeaker but the DC current is at a low enough level that the performance of the speaker is not significantly degraded. The composite transistor consists of a PNP transistor with its collector connected to the base of an NPN transistor and its emitter connected to the collector of the NPN transistor. A signal from the cascode section is applied as a current to the base of the PNP transistor of the composite pair. A resistor in series with the loudspeaker is also used to limit current in the output circuit and adjust the bias voltage level on the emitter of the PNP transistor. This resistor also improves the output impedance of the composite transistor and consequently the impedance of the amplifier.

The output stage transistors as employed in the present amplifier are of sufficiently high voltage and current capability to withstand the stress of the telephone circuit environment with the protection of the aforementioned signal limiting circuit as well as the aforementioned decoupling and isolation network. Due to the current amplification nature of the amplifier it operates well over a wide range of telephone loop lengths. It will operate from a zero loop at high central office battery voltage to long loops when result in low central office battery voltage. Amplifier operating voltages over the range of 3 volts DC to over 15 volts DC make the circuit suitable for use on telephone circuits with only one instrument offhook (the master unit). Usually when the monitor amplifier is connected and functioning the handset microphone is disconnected or muted to prevent feedback singing.

Accordingly the principle objects of the present invention include two-wire telephone line powered capability, signal limiting and surge protection, a circuit configuration which results in high current amplification making operation over a wide range of telephone loop conditions acceptable, the ability to use low impedance loudspeakers, the use of current source and current mirror for control of amplifier bias and the use of a cascode stage in combination with a composite transistor output stage.

BRIEF DESCRIPTION OF THE DRAWING

The single sheet of accompanying drawings is a combination block and schematic circuit diagram of a high gain current amplifier which functions as a telephone monitor amplifier with signal limiting network. It should be noted that the conventional telephone circuitry as well as protective devices have not been shown for purposes of simplicity and in as much as they do not form a direct portion of the present invention.

DESCRIPTION OF THE PREFERRED EMBODIMENT

Referring now to the accompanying drawing, the telephone monitor amplifier circuit is shown with its connection to the positive polarity guard PR1 through hookswitch HKSW as the positive supply connection point and with the negative or common connection to the negative output of the polarity guard. The polarity guard in turn is of course connected to a telephone line. To allow operation of the amplifier of the present invention, the hookswitch HKSW which is shown as being under system control 10 must be closed to allow operation. The method of hookswitch control is not a part of the present invention and therefore will not be described.

Capacitor C1 and diode CR2 and CR3 provide signal limiting and basic surge protection internal to the amplifier circuit. Resistor R1 and capacitor C3 provide decoupling and isolation between the signal input provided through capacitor C2 and DC power requirement for the amplifier circuit.

In the present circuitry transistor Q1 which is of the NPN type, together with resistor R2 and diode CR4 form a current source providing current for biasing transistors Q2, Q3 and Q4. Transistor Q2 which is of the NPN type, forms a current mirror for transistor Q4 which is also the NPN type. This functions because usually resistor R4 and resistor R5 are equal in value. Likewise resistor R6 is equal in value to resistor R8.

Because of this arrangement transistor Q4 has a very stable bias condition despite variations in supply voltage. Transistor Q3 of the NPN type also has a stable bias current due to current source Q1 and the constant current drive.

Transistors Q4 and Q3 form the cascode section of the amplifier with the input signal applied to the base of transistor Q4 from the telephone line by being coupled through capacitor C2. The output of the cascode stage is fed as an amplified current (AC) into the base of the composite transistor which consists of transistors Q5 and Q6 from the collector of transistor Q3. It should be noted that transistor Q5 is of the PNP type while transistor Q6 is of the complimentary or NPN type.

Transistors Q5 and Q6 in the output stage further amplify the current approximately in accordance with the product of the transistors current gains and drive the amplified current through the speaker load SB1 and resistor R9 back to the AC common at capacitor C3. Capacitor C4 connected between the collector of transistor Q5 and the base of the transistor Q6 and coupled to ground, provides high frequency signal rolloff, to prevent parasitic RF oscillation.

Resistor R8 in the emitter circuit of transistor Q4 provides a degree of negative feedback to reduce distortion. Resistor R7 connected between the positive voltage supply (through resistor R1) and connected between the collector of transistor Q3 and the base of transistor Q5 acts as the collector load resistor for the cascode section. Resistor R9 included in the load circuit increases the amplifier output impedance to prevent loading effects on the telephone instrument circuits.

It should be noted from the foregoing that a practical current amplifier is disclosed which is suitable for use as a telephone line monitor and compatible with the telephone instrument environment and telephone loop environment. Thus the circuit is direct coupled and requires no excessive high resistance values, the circuit is suitable for integration to microcircuit form, with the exception of the large electrolytic capacitors C1, C2 and C3 which could be provided external to the microcircuit.

It will be obvious however to those skilled in the art that numerous modifications may be made without departing from the spirit of the present invention which shall be limited only by the scope of the claims appended hereto.

What is claimed is:

1. A subscriber's telephone instrument circuit connected to a telephone line and including a loudspeaker and an amplifier connected between said loudspeaker and said telephone line, said amplifier comprising:
    a cascode amplifier stage including an input and an output;
    alternating current signal coupling means connected between said telephone line and said cascode amplifier stage input;
    a bias current source comprising a first transistor connected to and biasing said cascode stage and a second transistor functioning as a current mirror, said first and second transistors serially connected across said telephone line; and
    a composite amplifier stage including an input connected to said cascode amplifier output and further including an output connected to said loudspeaker;
    whereby electrical signals received over said telephone line are amplified and subsequently reproduced by said loudspeaker.

2. A subscriber's telephone instrument circuit as claimed in claim 1, wherein: there is further included a high frequency rolloff network connected to said composite amplifier stage.

3. A subscriber's telephone instrument as claimed in claim 2, wherein: said high frequency rolloff network comprises a capacitor.

4. A subscriber's telephone instrument circuit as claimed in claim 1, wherein: said AC signal coupling means further functions to block the flow of direct current.

5. A subscriber's telephone instrument circuit as claimed in claim 1, wherein: said AC signal coupling means comprises a capacitor.

6. A subscriber's telephone instrument as claimed in claim 1, wherein: there is further included a negative feedback network connected to said cascode stage.

7. A subscriber's telephone instrument as claimed in claim 6, wherein: said negative feedback network comprises a resistor.

8. A subscriber's telephone instrument as claimed in claim 1, wherein: said cascode amplifier stage comprises first and second NPN transistors collector-emitter paths serially connected across said telephone line.

9. A subscriber's telephone instrument circuit as claimed in claim 1, wherein: said composite amplifier stage includes first and second transistors of complimentary type.

10. A subscriber's telephone instrument circuit as claimed in claim 1, wherein: there is further included signal limiting and surge protection means connected across said telephone line.

11. A subscriber's telephone instrument circuit as claimed in claim 10, wherein: said signal limiting and surge protection means comprise a capacitor and parallel connected and oppositely poled diodes serially connected across said telephone line.

12. A subscriber's telephone instrument as claimed in claim 1, wherein: there is further included decoupling and isolation means connected between said telephone line and said current source.

13. A subscriber's telephone instrument as claimed in claim 12, wherein: said decoupling and isolation means comprise a resistor serially connected between said telephone line and said current source and a capacitor connected in shunt to said telephone line.

14. A subscriber's telephone instrument circuit as claimed in claim 8, wherein: said cascode amplifier stage connected across said telephone line includes a load resistor for said loudspeaker and a negative feedback resistor.

* * * * *